United States Patent
Liu et al.

(10) Patent No.: US 12,333,450 B1
(45) Date of Patent: Jun. 17, 2025

(54) SAMPLE SIZE AND DURATION PREDICTION FOR ONLINE ACTIVITY

(71) Applicant: Amazon Technologies, Inc., Seattle, WA (US)

(72) Inventors: Yu Liu, Bothell, WA (US); Thomas Richardson, Seattle, WA (US); James McQueen, Seattle, WA (US); Doug Hains, Shoreline, WA (US); Will Poff, Des Moines, WA (US); Tridiv Sardesai, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 972 days.

(21) Appl. No.: 17/407,968

(22) Filed: Aug. 20, 2021

(51) Int. Cl.
G06F 17/00 (2019.01)
G06F 17/18 (2006.01)
G06N 5/04 (2023.01)

(52) U.S. Cl.
CPC .............. *G06N 5/04* (2013.01); *G06F 17/18* (2013.01)

(58) Field of Classification Search
CPC .................................. G06N 5/04; G06F 17/18
See application file for complete search history.

(56) References Cited

U.S. PATENT DOCUMENTS

| | | | |
|---|---|---|---|
| 2014/0344224 A1* | 11/2014 | LeBert | G06F 16/958 707/684 |
| 2014/0379436 A1* | 12/2014 | White | G06Q 10/0639 705/7.38 |
| 2016/0283970 A1* | 9/2016 | Ghavamzadeh | G06Q 30/0269 |
| 2021/0185076 A1* | 6/2021 | Miller | H04L 63/107 |

OTHER PUBLICATIONS

Julián Grigera et al., Live versioning of web applications through refactoring. In Proceedings of the 33rd ACM/IEEE International Conference on Automated Software Engineering. Association for Computing Machinery, 872-87, <https://doi.org/10.1145/3238147.3240483>, Sep. 2018.*

* cited by examiner

*Primary Examiner* — Greta L Robinson
(74) *Attorney, Agent, or Firm* — K&L Gates LLP

(57) ABSTRACT

Devices and techniques are generally described for sample size prediction for online activity. In various examples, first data related to a first sample of users interacting with an online service during a first time period may be received. In some cases, first key performance indicator (KPI) data related to the first sample of users' interaction with the online service may be received. A predicted sample size of users that will interact with the online service for a second time period following the first time period may be predicted. A predicted statistical power may be determined using the predicted sample size. In some examples, a minimum amount of time to route traffic to the online service may be determined based at least in part on the predicted statistical power.

20 Claims, 10 Drawing Sheets

SAMPLE SIZE AND DURATION PREDICTION FOR ONLINE ACTIVITY

BACKGROUND

In randomized experiments such as A/B tests the starting point is typically a population of units such as individuals, time periods, plots of lands, etc. A subset of the population is assigned to a treatment group which will be exposed to a new treatment, with the remainder of units being assigned to the control group (which will not receive the new treatment). Outcomes are observed for the units and average outcomes for units in the treatment group are compared to average outcomes for units in the control group. Statistical analysis is typically performed using the outcomes to determine causal effects and/or correlations.

DETAILED DESCRIPTION

Figure 1:
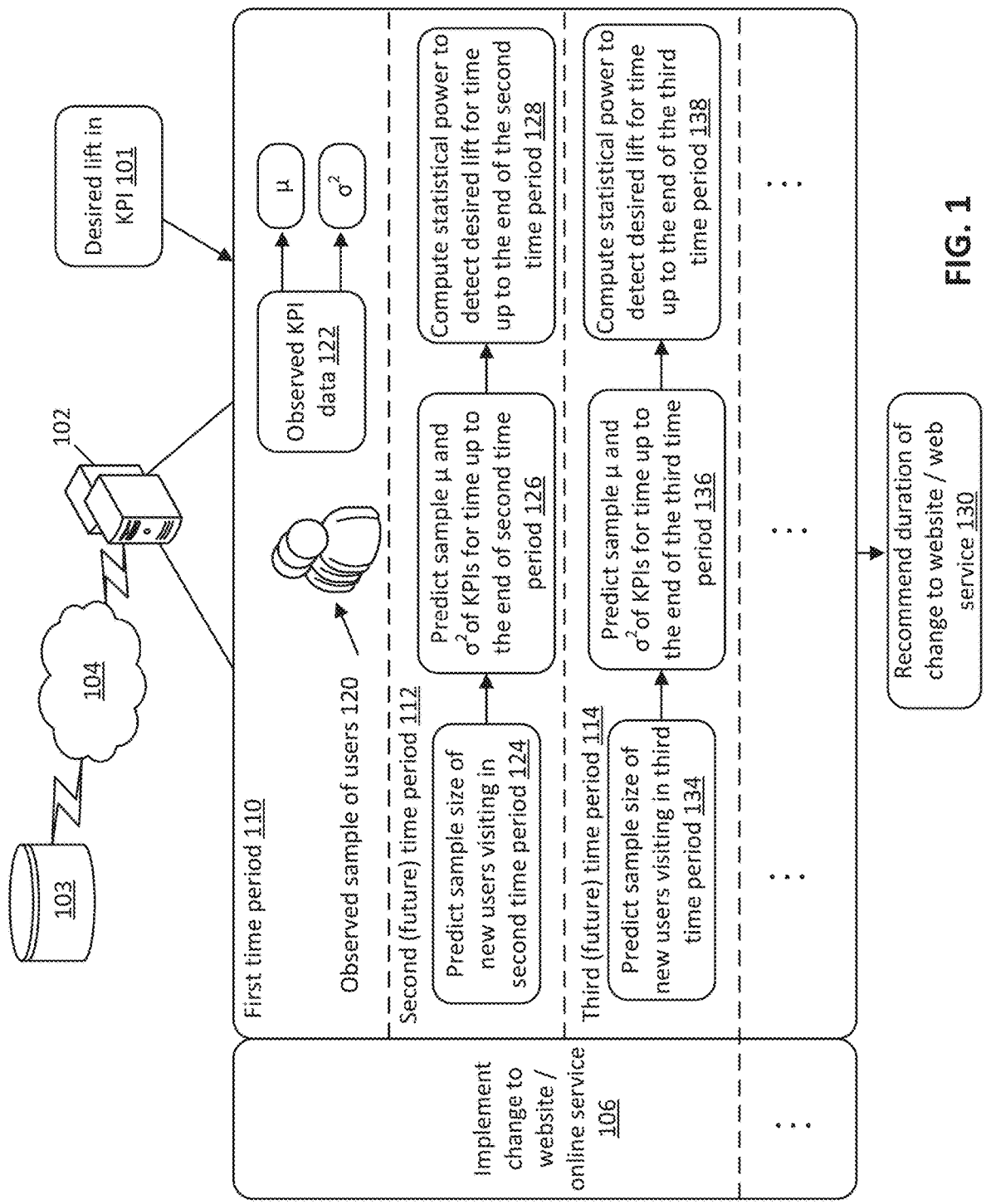
FIG. 1 depicts an example of sample size and duration prediction for online activity, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Online experiments, which are often referred to as "A/B tests" are randomized experiments which compare an online user's response to two (or more) versions of an online service, website, etc. The versions are often called 'treatments,' denoted by 'A' and 'B.' This allows the owners of the product to infer how changing the treatment will impact the users' response. By convention, version A, also referred to as 'Control' is the current, in-production version of the product and version B ('Treatment') is some new variation. When running an A/B test, the experimenter must decide on the experiment's duration. If this is too short, the actual impact of the experiment will be difficult to detect since insufficiently many customers will participate in the experiment. On the other hand, if an online A/B test is run for too long, both operational and opportunity costs continue to grow, innovation is blocked and the experimental results become increasingly difficult to interpret due to noise. Traditional "power calculations" which estimate the minimum sample size required to detect an effect of a given size do not directly address the duration question since it is unclear how long it will take for the required number of unique customers to have 'triggered' the experiment. This is because when a customer chooses to arrive at the website and triggers into the experiment is entirely up to the customer. An alternative approach is to estimate the minimal number of weeks by using historical data from similar past experiments. However, in practice it is difficult to know which previous experiments are sufficiently similar, especially if the treatment involves a new feature.

As experimenters do not know in advance the level of traffic their online A/B test will experience, their initial choice of experiment duration is often not optimal. The various techniques described herein solve this problem by using the traffic observed during an initial period to estimate the additional time for which the modification of the online service should be conducted in order to detect a defined change in some performance indicator. Specifically, given the number of unique individuals who triggered the online service for the first time during each day in an initial period (for example a week), a hierarchical Bayesian Beta-Geometric model is used to predict the number of additional individuals who will trigger for the first time during a subsequent period (e.g., during a subsequent week). This problem is challenging because in general, there will be heterogeneity within the population: individuals who visit the site more often will typically trigger the experiment much more quickly than infrequent visitors. This unknown heterogeneity must be taken into account when making predictions for subsequent periods.

Relating the approach described herein to prior work, there is a long history of using hierarchical beta-binomial models in Bayesian statistical inference for count data. However, prior work has not applied these models to inference for the number of individuals initiating behavior in a given (future) time period. After obtaining the sample size prediction, the practical utility of the model is shown by using it to forecast power and thus to make more accurate recommendations for experiment duration and/or for the duration of the change to the online service/website.

In many contexts it is useful to predict the number of individuals in some population who will initiate a particular activity during a given period. For example, the number of users who will install a software update, the number of customers who will use a new feature on a website, or who will participate in an A/B test. In practical settings, within the relevant prediction window, a significant fraction of the total population will have initiated the activity. Furthermore, there is heterogeneity amongst individuals with regard to the distribution of time until they will initiate. For these reasons it is inappropriate to assume that the number of individuals on successive days are identically distributed. Given an observed level of activity in an initial period, described herein are novel Bayesian methods for predicting the number of such individuals who will participate during an extended period. Additionally various techniques are described for using the predicted sample size to determine the minimum amount of time to implement an online activity (e.g., website functionality, a new version of an online system, a new feature of a website/web service relative to a previous version of the website/web service etc.) in order to detect a specified change in one or more key performance indicators (KPIs).

Typically, online experiment durations are planned ahead of time, and duration is selected by referring to past, similar experiments. However, it is difficult to determine which past experiments are sufficiently similar, particularly when the treatment involves a new feature. Accordingly, the computer-implemented model described herein provides a user with updated duration recommendations based on real traffic (obtained during the experiment). The procedure is iterative and allows duration to be modified mid-experiment in a statistically robust way.

There are many situations in which it is necessary to predict the number of individuals who will engage in an activity for the first time during some specified period. For example, among users of a mobile app we may wish to predict how many existing users will have used a new feature, or we may wish to know how many users will have chosen to install an update. In the domain of online experimentation or A/B testing it is useful to predict the number of individual users who will take part in the experiment as this can be used to determine how long an experiment needs to run in order to achieve a desired power level.

The problem discussed herein is as follows: given a fixed population and observations on the number of individuals who initiate activity during an initial period of time, for example, a week, predict the number of additional individuals who will initiate activity during a subsequent period of time, such as another week, or an additional three weeks, etc.

The problem is challenging because, in general, there will be heterogeneity within the population: some individuals will initiate much more quickly than others—for example daily users of a mobile app versus those who use it only for specific occasional purposes. The users who are observed to initiate activity at the start of the observation period will be weighted more heavily towards frequent users than is the case subsequently. This unknown heterogeneity must be taken into account when making predictions for subsequent periods. In simple terms, the number of individuals who are observed to trigger on successive days are not observations from a stationary process.

Described herein are systems and techniques that use a hierarchical Bayesian Beta-Geometric model with censoring to model the heterogeneity of individuals in the population with respect to their propensity to initiate activity on any given day. Estimates for the number of additional individuals arriving in subsequent periods can then be obtained by simulating from the posterior predictive distribution. A convenient by-product of the simplicity of the techniques described herein is that it is possible to sample from the posterior via straight Monte-Carlo simulation, thereby avoiding issues that may arise with Markov Chain approaches such as assessing convergence and mixing times.

Determination of the minimum sample size necessary to obtain a desired power level in a hypothesis test is central to the design of experiments. Changes to online services (e.g., website/web service functionality, design, etc.) are often tested prior to fully subjecting the change to live traffic using A/B tests. An A/B test subjects some portion of internet traffic to a current version of the website/web service without the proposed change(s) (e.g., the treatment(s)) and other portions of traffic to a version of the website/web service that includes the proposed change(s) to determine which version results in the maximum impact to one or more key performance indicators (KPIs) (sometimes referred to as "lift").

The remainder of the paper is organized as follows. In the following section, the assumptions underlying the accrual model are described. In the following section, priors are described and posterior distributions are calculated given the observed counts in the initial period. Inferences about the number of additional individuals arriving in the second period are made by computing the posterior predictive distribution. In the subsequent section, a description of how the sample size predictions from the model may be used to predict the power to detect a given effect size.

1 Accrual Model

Consider a set of individuals indexed by $i \in \{1, \ldots, n\}$. On any given day an individual may initiate online activity or 'trigger'. It may be assumed that, if an individual i has not triggered on a previous day then there is a probability, $\pi_i \in (0, 1)$, that the individual i will trigger on the current day. A simple model is postulated that supposes that if an individual does not trigger on day t, an event which occurs with probability $(1-\pi_i)$, then their probability of triggering on the next day, t+1, remains $\pi_i$. Second, it is assumed that given knowledge of the set of individual specific trigger probabilities $\{\pi_1, i=1, \ldots, n\}$, the number of days until the individual first triggers is independent of the number days before any other individual first triggers.

Given the model assumptions, the day on which individual i first initiates will follow a Geometric distribution with probability $\pi_i$:

$$\text{trigger first on day } k|\pi_i \sim \text{Geo}(\pi_i). \tag{1}$$

A Bayesian formulation is adopted and It is modeled as continuous with density $p(\pi)$ with support on (0, 1). The (expected) proportion of individuals who first trigger on day k is:

$$P(\text{trigger first on day } k) = \int_0^1 P(\text{trigger on day } k|\pi)p(\pi)d\pi = \int_0^1 \pi(1-\pi)^{k-1}p(\pi)d\pi = E\left[\pi(1-\pi)^{k-1}\right]$$

It follows that the density for It among individuals who first trigger on day k is given by:

$$p(\pi|\text{trigger first on day } k) = \frac{\pi(1-\pi)^{k-1}p(\pi)}{E\left[\pi(1-\pi)^{k-1}\right]},$$

and thus
E [|{individuals who first trigger on the day k with $\pi_i \in [a, b]$}|]

$$= n \cdot E\left[\pi(1-\pi)^{k-1}\right] \int_a^b \frac{\pi(1-\pi)^{k-1}p(\pi)}{E\left[\pi(1-\pi)^{k-1}\right]} d\pi$$

$$= n \int_a^b \pi (1-\pi)^{k-1} p(\pi) d\pi.$$

2 Inference for the Accrual Model

In this section a model describing the distribution of the trigger probabilities $\pi$ is described. The model is formulated hierarchically, with a Beta distribution over the unknown trigger probabilities.

2.1 Geometric Likelihood with Censoring

For each individual who triggers in the first period of length d let $X_i$, $i \in \{1, 2, \ldots, n\}$ indicate the day on which they first triggered; if an individual i never triggers in the first period, then let $X_i=0$. Thus $X_i \in \{0, 1, \ldots, d\}$, where d=7 if the first period, for which data is observed, is a week. The model is specified formally as follows:

$$p(X_i = k | \pi_i) = \begin{cases} \pi_i (1-\pi_i)^{k-1}, & k \in \{1, \ldots, d\}, \\ (1-\pi_i)^d, & k = 0, \end{cases}$$

$$= \pi_i^{\mathbb{I}(x_i>0)} (1-\pi_i)^{(x_i-1)\mathbb{I}(x_i>0)+d\mathbb{I}(x_i=0)};$$

$$\pi_i | \alpha, \beta \sim \text{Beta}(\alpha, \beta);$$

$$p(\alpha, \beta) \propto (\alpha+\beta)^{-5/2}.$$

Figure 7:
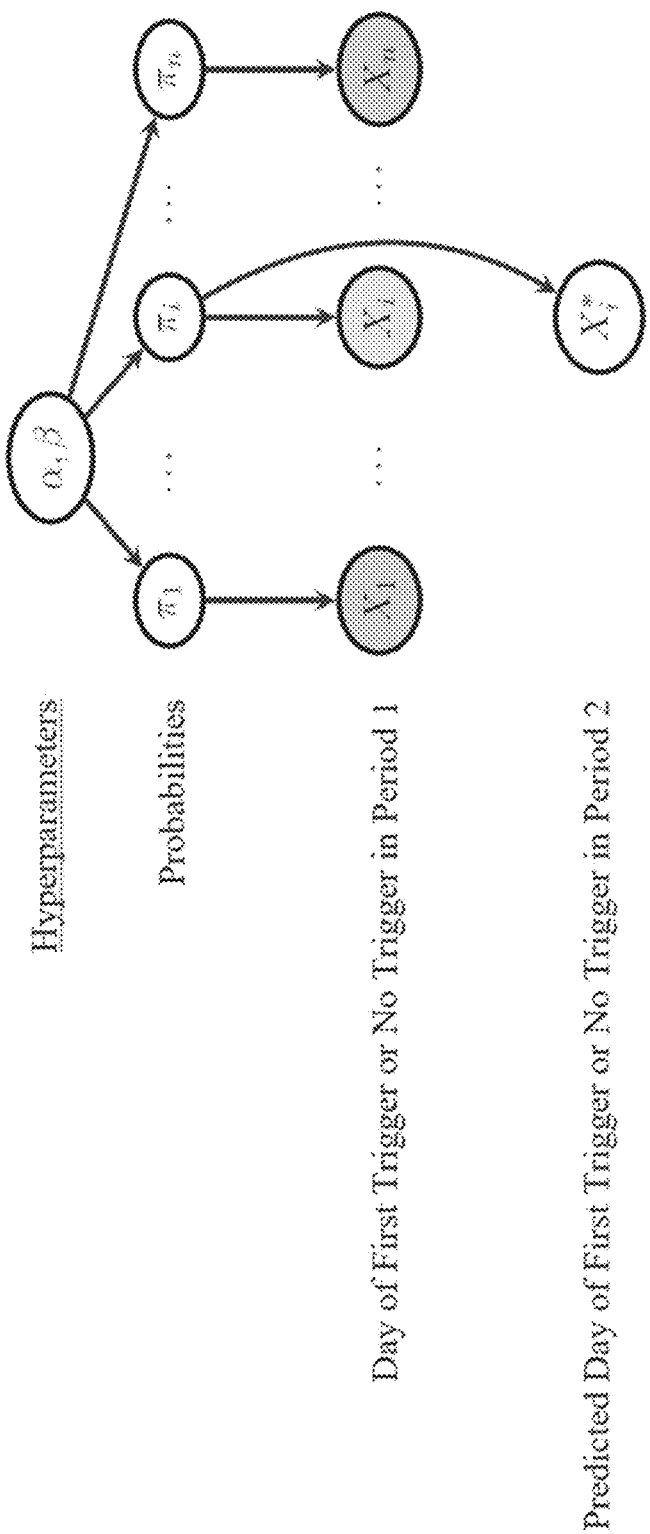
FIG. 7 depicts an example graphical representation of a hierarchical Beta-Geometric model that may be used in accordance with various examples described herein.

Here $\mathbb{I}(\cdot)$ is an indicator function taking the value 1 if the condition is true and 0 otherwise. $p(X_i=k|\pi_i)$ follows a censored geometric distribution with success probability $\pi_i$, where values larger than d are censored and recorded as 0. The conjugate prior is used for $\pi_i$ which is Beta($\alpha, \beta$). The hyper prior $p(\alpha, \beta)$ is a default prior that is used. A graphical depiction of the proposed model is shown in FIG. 7. In FIG. 7, the lighter shading for value $X_i$ (e.g., as opposed to the darker shading of $X_1$ and $X_n$) indicates an individual that did not trigger in the first period. Accordingly, a prediction $X_i^*$ for the individual is computed, the prediction $X_i^*$ representing when/if the individual triggers in the second period.

From the two assumptions in in the Accrual Model section, it follows that the parameters $(\pi_i, \ldots, \pi_n)$ are independent identically distributed (i.i.d.) conditional on the hyper parameters $\alpha, \beta$. In other words, under the model each individual's probability $\pi_i$ is an i.i.d. draw from a Beta($\alpha, \beta$) distribution.

To understand and motivate the hyper prior, the following facts about Beta distributions are first noted: If $\pi^* \sim \text{Beta}(\alpha, \beta)$ then:

$$E[\pi^*] = \frac{\alpha}{\alpha+\beta} \in [0, 1]. \quad (a)$$

(b) The variance is given by:

$$V[\pi^*] = \frac{\alpha\beta}{(\alpha+\beta)^2(\alpha+\beta+1)} = \frac{E[\pi^*](1-E[\pi^*])}{\alpha+\beta+1} \le \frac{1}{4(\alpha+\beta+1)} \quad (5)$$

where the fact that $E[\pi^*](1-E[\pi^*]) \le \frac{1}{4}$ is used. Consequently, for large $\alpha, \beta$, $\text{sd}(\pi^*) \approx (\alpha+\beta)^{-0.5}/2$.

Consequently the hyperprior (4) corresponds to putting independent (improper) uniform priors on $E[\pi^*] = \alpha/(\alpha+\beta)$ and $(\alpha+\beta)^{-0.5} \approx \text{sd}(\pi^*)$. Note that the hyperprior (4) used here is improper; it does not integrate to 1. However, it will lead to a proper posterior provided that for at least one i, $0 < x_i < d$.

2.2 Posterior Predictive Probability that an Individual Who Did not Trigger in the First Period Will Again not Trigger in the Second Period The elements in the formula of the posterior predictive distribution are first computed for future point $X_i^*$ in FIG. 7. Let $x=(x_1, \ldots, x_n)$ be the vector recording the day of the first trigger or 0 if there was no visit during the first period for n individuals, and let $\pi = (\pi_1, \ldots, \pi_n)$ be the individual-specific probabilities.

From Bayes rule, following the independence assumptions, the joint posterior over parameters and hyper-parameters ($\alpha, \beta$) may be obtained:

$$p(\pi, \alpha, \beta | x) \propto p(\alpha, \beta) p(\pi | \alpha, \beta) p(x | \pi, \alpha, \beta) \quad (6)$$

$$\propto p(\alpha, \beta) \prod_{j=1}^n p(\pi_j | \alpha, \beta) \left( \prod_{k=1}^n p(x_k | \pi_k) \right)$$

$$\propto p(\alpha, \beta) \prod_{j=1}^n \frac{\Gamma(\alpha+\beta)}{\Gamma(\alpha)\Gamma(\beta)} \pi_j^{\alpha-1+\mathbb{I}(x_j>0)} (1-\pi_j)^{\beta-1+(x_j-1)\mathbb{I}(x_j>0)+d\mathbb{I}(x_j=0)}$$

Similarly, the conditional posterior distribution over $\pi_i$ given hyper-parameters ($\alpha, \beta$) and data $x_i$ is:

$$P(\pi_i | \alpha, \beta, x_i) \propto P(\pi_i | \alpha, \beta) p(x_i | \pi_i) \quad (7)$$

$$= \text{Beta}(\alpha + \mathbb{I}(x_i > 0), \beta + (x_i - 1)\mathbb{I}(x_i > 0) + d\mathbb{I}(x_i = 0))$$

$$= \frac{\Gamma(\alpha + \beta + x_i + d\mathbb{I}(x_i = 0))}{\Gamma(\alpha + \mathbb{I}(x_i > 0))\Gamma(\beta + (x_i - 1)\mathbb{I}(x_i > 0) + d\mathbb{I}(x_i = 0))}$$

$$\times \pi_i^{\alpha - 1 + \mathbb{I}(x_i > 0)} \times (1-\pi_i)^{\beta - 1 + (x_i - 1)\mathbb{I}(x_i > 0) + d\mathbb{I}(x_i = 0)},$$

where the fact that $\mathbb{I}(x_i > 0) + (x_i - 1)\mathbb{I}(x_i > 0) = x_i \mathbb{I}(x_i > 0) = x_i$ is used. Here (7) follows from the form of the joint posterior (6), which shows $\pi_i \perp \pi_{-1}, X_{-1} | x_i, \alpha, \beta$, where we use $\pi_{-1} = (\pi_1, \ldots, \pi_{i-1}, \pi_{i+1}, \pi_n)$ to indicate the 'other' elements of $\pi$ and likewise for $x_{-1}$; the conditional independence here may also be obtained by applying the graphical d-separation criterion to the DAG shown in FIG. 1. Thus from (7):

$$p(\pi | \alpha, \beta, x) = \prod_{j=1}^n p(\pi_j | \alpha, \beta, x_j) = \quad (8)$$

$$\prod_{j=1}^n \frac{\Gamma(\alpha + \beta + x_j + d\mathbb{I}(x_j = 0))}{\Gamma(\alpha + \mathbb{I}(x_j > 0))\Gamma(\beta + (x_j - 1)\mathbb{I}(x_j > 0) + d\mathbb{I}(x_j = 0))} \times$$

$$\pi_j^{\alpha - 1 + \mathbb{I}(x_j > 0)} (1 - \pi_j)^{\beta - 1 + (x_j - 1)\mathbb{I}(x_j > 0) + d\mathbb{I}(x_j = 0)}.$$

The posterior over the hyper-parameters $\alpha, \beta$ is then:

$$p(\alpha, \beta | x) = \frac{p(\alpha, \beta, \pi | x)}{p(\pi | \alpha, \beta, x)} \quad (9)$$

$$\propto p(\alpha, \beta) \prod_{j=1}^n \frac{\Gamma(\alpha + \mathbb{I}(x_j > 0))\Gamma(\beta + (x_j - 1)\mathbb{I}(x_j > 0) + d\mathbb{I}(x_j = 0))}{\Gamma(\alpha + \beta + x_j + d\mathbb{I}(x_j = 0))} \frac{\Gamma(\alpha + \beta)}{\Gamma(\alpha)\Gamma(\beta)}.$$

For a given individual i, who did not trigger in the first period, so $X_i = 0$, let $X_i^*$ be the first day on which the individual triggers in the second period of length $d^*$, or, as before, let $X_i^* = 0$ if they never trigger in the second period. Given the hyper-parameters ($\alpha, \beta$), it follows from (7) that:

$$p(X_i^* = x_i^* | \alpha, \beta, X_i = 0)$$

$$= \int p(X_i^* = x_i^* | \pi_i, \alpha, \beta, X_i = 0) p(\pi_i | \alpha, \beta, X_i = 0) d\pi_i$$

$$= \int p(X_i^* = x_i^* | \pi_i) p(\pi_i | \alpha, \beta, X_i = 0) d\pi_i$$

$$= \frac{\Gamma(\alpha + \mathbb{I}(x_i^* > 0))\Gamma(\beta + d + (x_i^* - 1)\mathbb{I}(x_i^* > 0) + d^+ \mathbb{I}(x_i^* = 0))}{\Gamma(\alpha + \beta + d + x^* + d^+ \mathbb{I}(x_i^* = 0))} \frac{\Gamma(\alpha + \beta + d)}{\Gamma(\alpha)\Gamma(\beta + d)}.$$

(10)

Thus, conditional on hyper-parameters ($\alpha$, $\beta$), the probability that an individual who has not triggered in the first period will again not trigger in the second period is:

$$p(X_i^* = 0 | \alpha, \beta, X_i = 0) = \frac{\Gamma(\alpha)\Gamma(\beta + d + d^*)\Gamma(\alpha + \beta + d)}{\Gamma(\alpha + \beta + d + d^*)\Gamma(\alpha)\Gamma(\beta + d)} \equiv q_0(\alpha, \beta, x) \quad (11)$$

Here $q_0(\alpha, \beta, x)$ is defined to be the probability that an individual who did not trigger in the first period will again not trigger in the second period. $q_0(\alpha, \beta, x)$ is expressed as a function of the full first period data x because this determines the set of individuals i who did not trigger in the first period, for whom $X_i = 0$. Note that under the model this probability will be the same for all people who did not trigger in the first week.

2.3 Predicting the Number of New Individuals in the Second Period

Denote $n_0$ as the number of individuals who did not trigger in the first period. Let $\{i_1, \ldots, i_{n_0}\}$ be the subset of individuals who did not trigger in the first period. An example of a triggering event may be navigating to a website, purchasing an item, using a new functionality of a website/web service, etc.

Given $\alpha$, $\beta$ the corresponding variables $\{X_{i_1}^*, \ldots, X_{i_{n_0}}^*\}$ are i.i.d., and have probability $q_0(\alpha, \beta, x)$ of taking the value 0. It follows that given $\alpha$, $\beta$ the number of individuals who did not trigger in the first period and who again did not trigger in the second period will follow a binomial distribution, with the following parameters:

$$n_{00} | \alpha, \beta, x \sim \text{Binomial}(n_0, q_0(\alpha, \beta, x)) \quad (12)$$

Hence a simple Monte-Carlo scheme for simulating from the posterior for $n_{00}$ is as follows:
1. Simulate $\alpha$, $\beta$ from the posterior distribution (9);
2. For each value of ($\alpha$, $\beta$) draw from the Binomial distribution given by (12).

In step one, the (straight) Monte-Carlo Ratio-of-Uniforms algorithm is used to sample $\alpha$, $\beta$.

Thus the number of individuals who did not trigger in the first period, but did trigger in the second period is:

individuals triggering for the first time in Period
$2 = n_0 - n_{00}$ (13)

This provides samples from the posterior for the number of additional individuals triggering during the second period.

2.4 Inference when Total Population Size is Unknown

In the development so far, it has been supposed that the number of censored observations, $n_0$ corresponding to individuals who did not trigger in the first period, is known. However, in some situations this may not be the case.

Fortunately, this turns out not to be a practical issue since: provided that the number of censored observations is large relative to the number of uncensored observations, the posterior distribution is not sensitive to the exact number of censored observations. In more detail, one may use a plug-in estimate of $n_0$ given by a multiple $\lambda$ of the uncensored observations.

$$\hat{n}_0 = \lambda \sum_{i=1}^n \mathbb{I}(x_i^* > 0).$$

Here, $\lambda$ may be tuned using past experiments.

3 Predicting Power to Detect a Specific Effect Size

The above algorithm is illustrated by using the observed number of triggers in the first week to generate a prediction as to the number of additional triggers during the subsequent period, for the purpose of predicting the power of an experiment to detect an effect of a fixed size.

3.1 Predicting the Sample Size

In the following example, using the methods described above, after observing a first weeks' traffic in an online experiment the number of new individuals who will trigger if the experiment continues running for additional k weeks is predicted. Let $\hat{n}_{g,1}$ for $g \in \{C, T\}$ be the number of triggers observed in arm g during the first week, and for $k > 1$ let $\hat{i}_{g,k}$ indicate the median of the posterior distribution for the number of new triggers observed in arm g during week k (13) which is derived from (11) setting $d^* = 7k$.

3.2 Predict the Sample Mean and Variance for the Full Period

If an individual in treatment group g first triggered in week l then let $Y_{i,m}^g$ be the outcome metric for that individual in week m where $m \geq l$. For the purpose of estimating power it is assumed that, after triggering, the mean weekly outcome within each treatment group g is the same for different individuals in different weeks, so that if an individual i first triggers in week l for $l \leq k$ then:

$E(Y_{i,l}^g) = E(Y_{i,l+1}^g) = \ldots = E(Y_{i,k}^g) = \mu^g.$

It is further assumed that the outcome for a given individual is independent of that for other individuals in the experiment. Under these assumptions the total outcome metric after k weeks averaged across individuals in group g will be:

$$\overline{W}_{g,k} = \frac{\sum_{\ell=1}^k \sum_{i \in S_\ell^g} \sum_{j=\ell}^k Y_{i,j}^g}{\sum_{\ell=1}^k |S_\ell^g|},$$

where $S_l^g = \{i | \text{individual } i \text{ first triggers in week } l\}$. A simple unbiased estimator for an individual's mean outcome after k weeks in group g is:

$$\hat{\mu}_{g,k} = \frac{\hat{n}_{g,1} \sum_{\ell=1}^k (k - \ell + 1) \hat{n}_{g,\ell}}{\sum_{\ell=1}^k \hat{n}_{g,\ell}}, \text{ for } k > 1, \quad (14)$$

where $\hat{u}_{g,1}$ is the sample mean of group $g \in \{C, T\}$ in the first week and $\hat{n}_{g,l}$ for $l>1$ is the prediction of $|S_l^g|$ obtained by the techniques described above.

Further assume the variance of the outcome metric across individuals are the same for different weeks, so that if an individual i first triggers in week 1 for $1 \leq k$ then $$\text{Var}(Y_{i,l}^g) = \ldots = \text{Var}(Y_{i,k}^g) = \sigma_g^2.$$

Similarly, for $i \in S_l^g$ we define $\mu_{m,m^*}^g = \text{corr}(Y_{i,m}^g, Y_{i,m^*}^g)$, where $m, m^* \in \{1, \ldots, k\}$, to be the correlation in weekly outcomes. Lastly it is assumed that there exists a constant $\rho_{max}$ such that $\rho_{m,m^*}^g \leq (\rho_{max})^{|m-m^*|}$ for any $m \neq m^*$. In practice $\rho_{max}$ may be tuned from past experiments and may be set to a constant.

It then follows that the variance of the mean outcome metric up to k weeks in group g is as follows:

$$\text{Var}[\overline{W}_{g,k}] = \frac{\sum_{l=1}^{k} \sum_{i \in S_l^g} \text{Var}\left(\sum_{j=l}^{k} Y_{i,j}^g\right)}{\left(\sum_{l=1}^{k} |S_l^g|\right)^2} \leq \tag{15}$$

$$\frac{1}{\left(\sum_{l=1}^{k} |S_l^g|\right)^2} \left[\sigma_g^2 \sum_{l=1}^{k} |S_l^g| \left(\sum_{m=l}^{k} \sum_{m^*=l}^{k} (\rho_{max})^{|m-m^*|}\right)\right].$$

An upper bound may be used to obtain a conservative prediction of power. Finally, let $s_{g,k}^2$ be an estimator of the upper bound (15) obtained by substituting the sample variance for group g in the first week for $\sigma_g^2$ and $\hat{n}_{g,l}$ for $|S_l^g|$.

3.3 Predicted Power Against a Fixed Effect Size

A significance test of with the following null and alternate hypotheses may be performed $$H_0: \mu_{C,k} = \mu_{T,k}, H_a: \mu_{C,k} \neq \mu_{T,k},$$

using the two-sample Welch statistic. The goal may be to predict the power to detect a fixed effect size t (e.g., KPI lift) given that the experiment runs for k weeks; the difference $\delta_k$ between the overall outcomes under treatment and control is $$\delta_k = \mu_{T,k} - \mu_{C,k} = \tau \mu_{C,k}$$

The statistical power for this test is given by:

$$p(\delta_k, S_{p,k}, \alpha) = p\left(z < -t_{1-\alpha/2} - \frac{\delta_k}{S_{p,k}}\right) + p\left(z > t_{1-\alpha/2} - \frac{\delta_k}{S_{p,k}}\right) = \tag{16}$$

$$\Phi\left(-\frac{\delta_k}{S_{p,k}} - t_{1-\alpha/2}\right) + \Phi\left(\frac{\delta_k}{S_{p,k}} - t_{1-\alpha/2}\right)$$

in which $\alpha$ is the significance level and $t_{1-\alpha/2}$ is the $1-\alpha/2$ quantile of the t distribution (with the degrees of freedom given by Welch's formula) and $S_{p,k} = \sqrt{s_{C,k}^2 + s_{T,k}^2}$, where $s_{g,k}^2$ with $g \in \{C, T\}$ was defined above. The prediction of power is obtained by plugging in the predicted sample size, predicted mean and conservative variance estimate into (16). Note that given the data, (16) depends only on the target number of weeks k, $\alpha$ and percent lift $\tau$; thus, (16) is written as power $(\tau, \alpha, k)$.

4 Model Performance

In order to evaluate the performance of the model, experiments were performed that ran for at least two weeks during the last year. Experiments were pre-screened to ensure that randomization was carried out correctly.

4.1 Performance of Sample Size Forecast

Among the set of experiments we collected there were 2452 of experiments running for at least 2 weeks, 1721 that ran for at least 3 weeks and 1210 running for at least 4 weeks.

For each experiment the data for the number of new triggers each day during the first week was used and with $\lambda=10$ to predict the total sample size in each arm if the experiment continues running additional k weeks, or k+1 weeks in total. The predicted sample size was then compared with actual sample size; see the top panel in FIG. 8A.

The proposed model was compared to two baseline models: A simple linear prediction obtained by scaling the observed number of individuals, $\hat{n}_{g,1}$ who triggered in the first week by the number of additional weeks, i.e. $k \cdot \hat{n}_{g,1}$. Note that this model would be unbiased if new triggers arrived via a stationary process. In addition, the proposed predictor was compared to a simple log-linear model:

$$\log(T_d+1) = \beta_0 + \beta_1 d + \epsilon_d,$$

where $T_d$ is the number of individuals who first trigger on day d and $\epsilon_d$ are independent errors with $E[\epsilon_d|d]=0$. Estimates for $\beta_0$ and $\beta_1$ are obtained by linear regression of the log of the number of new triggers on day d against d, for $d=1, \ldots, 7$. The predicted number of additional individuals after k weeks can be extrapolated by plugging in $d=8, \ldots, 7k$ and then summing the predictions.

Figure 8A:
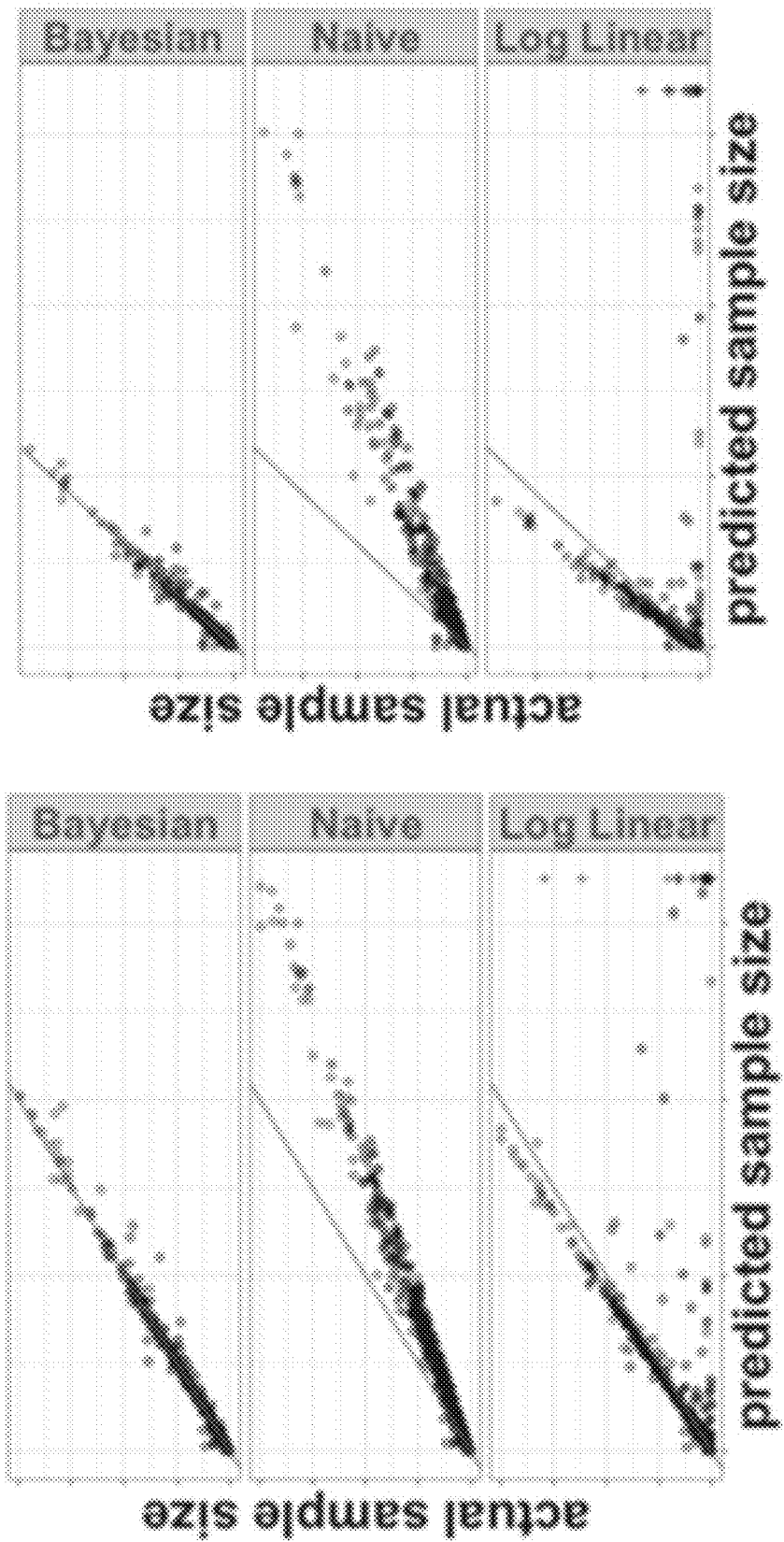
FIG. 8A depicts experimental results showing actual sample size vs. predicted sample size of newly-triggering individuals.

Due to the existence of outliers in log linear predictors, log linear predictors may be Winsorized at the right hand limit of the horizontal axis for the purpose of visualization in FIG. 8A.

From FIG. 8A, it is concluded that (1) the cumulative number of triggers is not a linear function of time. (2) The performance of the naive estimator is worse for k=4 than for k=2. This shows that for online experiments, there are fewer new individuals accrued with each subsequent day. (3) The proposed method has the best performance among the three predictors. (4) The log linear predictor is unstable.

In FIG. 8A, the vertical axes show the true total number of individuals in an experimental arm after k weeks; the horizontal axes give the predicted count of individuals in that arm based on the first week of data. The 45° line, corresponding to perfect prediction, is shown in red. Scatter plots contains accumulative sample size of every single arm at week k for experiments running at least k weeks. Panel (a) shows results for 6064 experimental arms that ran for 2 weeks; Panel (b) shows 3008 experimental arms that ran for 4 weeks. Plots compare the performance of the proposed predictor (top), naive predictor (middle) and log linear predictor (bottom) at (a) 2 weeks (b) 4 weeks. For visualization purposes, outliers in the log linear predictor are Winsorized at the maximum value on the horizontal axis and indicated by +.

We use the Root Mean Square Error (RMSE) to quantify the prediction performance.

$$RMSE = \sqrt{\sum_{i=1}^{n} \frac{(Predicted_i - Actual_i)^2}{n}}.$$

Table 1 compares the RMSE for the naive, log linear and the proposed Bayesian estimator. These results confirm that the Bayesian model clearly outperforms the log-linear and naive models.

TABLE 1

RMSE comparison between the naive, log linear and Bayesian sample size predictors. The Bayesian model outperforms the naive and log linear predictors, achieving at least an 85% improvement in RMSE.

| experiment weeks | naive | log-linear | proposed | % improvement from naive to proposed |
|---|---|---|---|---|
| Week 2 | 7.1e+6 | 3.16e+11 | 1e+6 | 85.35% |
| Week 3 | 1.44e+7 | 1.87e+18 | 1.87e+6 | 86.96% |
| Week 4 | 2.12e+7 | 1.25e+25 | 2.04e+6 | 90.36% |

4.2 Performance of Forecast Power

In order to evaluate our method for predicting power to detect a fixed effect size, we obtained the sample sizes and the sample variances for the outcome metrics for all individuals who triggered the experiment in any arm during week 1; we also obtained the sample mean of the outcome metric for those in the control arm in week 1.

We define the power against a fixed effect size ($\tau$) as the power computed from (16) by plugging in the actual sample size, actual variance, actual control mean and assumed effect size $\tau$. Similarly, the predicted power against a fixed effect size ($\tau$) is defined as the power computed from (16) by plugging in the predicted sample size, predicted mean under C, predicted variances for T, C and the assumed effect size $\tau$. For these power calculations we use the conventional $\alpha=5\%$ and an effect size $\tau=0.5\%$. Note that in all of these power calculations we are not making any use of information on the sample mean under treatment.

Figure 8B:
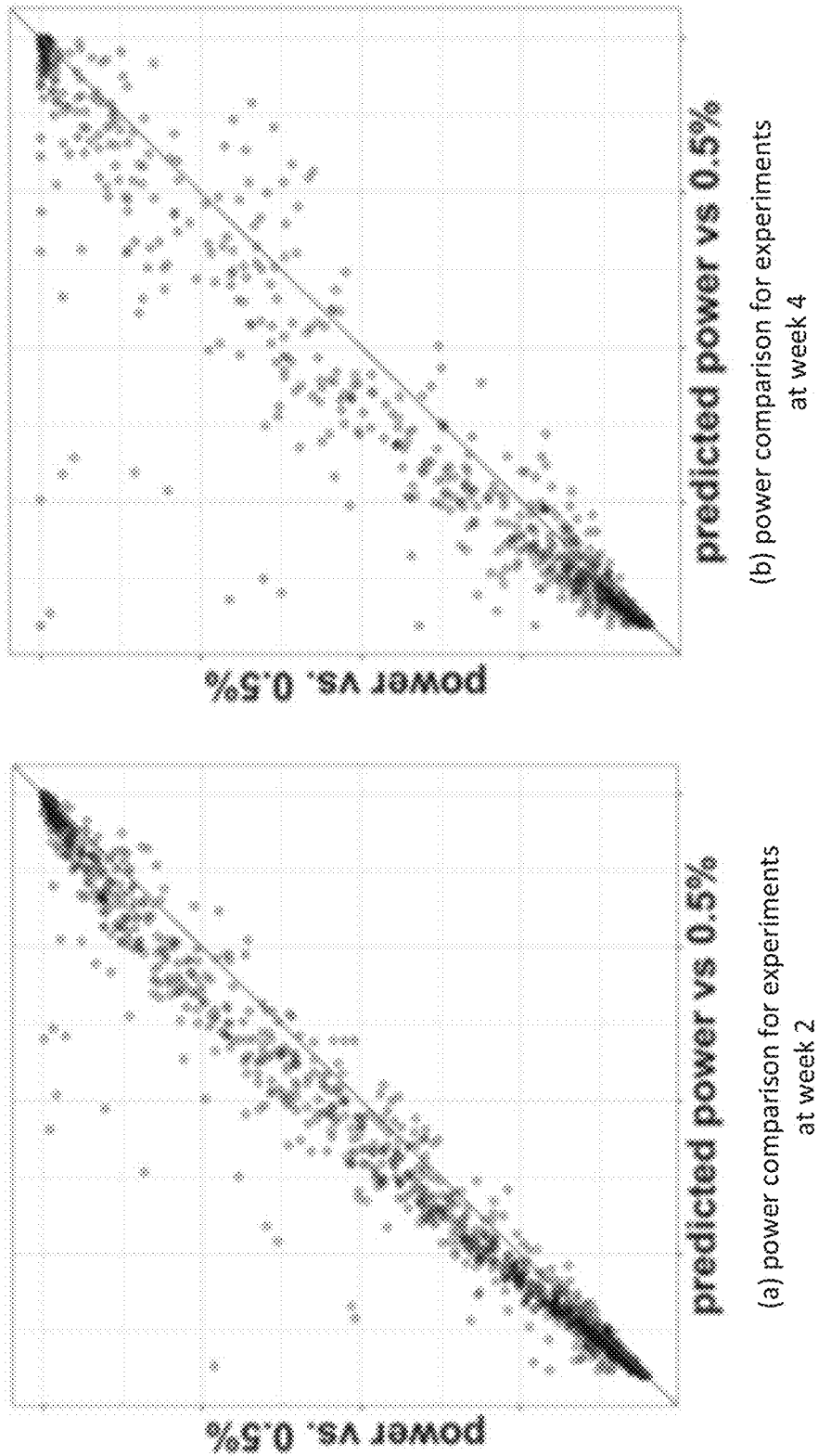
FIG. 8B depicts experimental results showing scatter plots of observed power against a fixed alternative effect size for a two-sided hypothesis test versus the predicted power from the Bayesian model for the same test at 2 weeks and 4 weeks.

FIG. 8B displays scatter plots of predicted power versus power. We conclude that: (1) Predicted power is close to the observed power and is slightly conservative. In practice this means that if decisions regarding how long the experiment should run are based on the predictions of the model then experiments may be run slightly longer than necessary, which will still guarantee sufficient sample size. (2) The prediction accuracy at 2 weeks is greater than at 4 weeks.

In FIG. 8B, scatter plots of observed power are plotted against a fixed alternative effect size (0.5%) for a two-sided hypothesis test with $\alpha=5\%$ versus the predicted power from the Bayesian model for the same test and alternative (0.5%) at (a) 2 weeks (b) 4 weeks. The 45° line is shown in red.

In Table 2, each row shows the median and standard deviation of the absolute difference between predicted power and power against t for experiments running k weeks. We conclude that the predicted power against a fixed alternative is close to the power against t that is subsequently observed.

TABLE 2

Summary statistics of the absolute difference between predicted power and actual power to detect an effect of size $\tau$.

| experiment weeks | median | standard deviation |
|---|---|---|
| Week 2 | 0.0039 | 0.0438 |
| Week 3 | 0.0059 | 0.0677 |
| Week 4 | 0.0073 | 0.0925 |

Accordingly, described herein is a computer-implemented Bayesian approach to predicting online activity in a fixed population. The utility of this method is demonstrated by applying it to predict sample size in online A/B testing. This method can be used to make predictions regarding the power to detect fixed effect sizes if an experiment runs for k weeks. The performance of predictions have been evaluated by comparing them to the ground truth in a large collection of online experiments. The results show the practical utility of the proposed method.

FIG. 1 depicts an example of sample size and duration prediction for online activity, according to various embodiments of the present disclosure. In various examples, one or more computing devices may implement a sample size and duration prediction system 102 for online activity. In examples where more than one computing device implements the sample size and duration prediction system 102, the different computing devices may communicate with one another over a network 104. For example, a remote computing device (and/or remote system of computing devices) may communicate with sample size and duration prediction system 102 via an application programming interface (API) as a cloud-based service. For example, a desired lift in KPI 101 (e.g., a 10% increase in click through rate, a 2% increase in revenue, a raw increase in the KPI, or other predefined effect) may be specified by a third party online service that would like to know how long an online A/B experiment should be conducted in order to detect the specified lift. The third party online service may send data associated with traffic to the website/online service (and/or interaction data indicating interaction with one or more features) during a past time period. For example, data indicating the observed sample of users 120 visiting the treated website/web service (and/or interactions of the observed sample of users) during the first time period 110 may be sent via an API to the sample size and duration prediction system 102. In various examples, the third party may implement the change to the website and/or online web service 106. However, in some cases the sample size and duration prediction system 102 may implement the change and/or conduct the experiment.

Observed sample of users 120 visiting the treated website/web service may be associated with observed KPI data 122. For example, clicks, purchases, and/or other behavior associated with these past users and their interaction with the treated website/web service may be measured and represented as KPI data 122. Additionally, the observed sample of users 120 may be measured during the first time period 110. Accordingly, the observed KPI data 122 may be known. A mean and variance of the observed KPI data 122 (e.g., observed mean KPI and observed variance of KPI) for the observed sample of users 120 during the first time period 110 may be measured and/or recorded programmatically.

In various examples, each of the one or more computing devices used to implement sample size and duration prediction system 102 may comprise one or more processors. The one or more computing devices used to implement sample size and duration prediction system 102 may be configured in communication with at least one non-transitory computer readable memory 103 ("memory 103"). In at least some examples, the one or more computing devices used to implement sample size and duration prediction system 102 may communicate with memory 103 over network 104. The memory 103 may store computer-readable instructions that, when executed by at least one processor of the one or more computing devices implementing sample size and duration prediction system 102, may be effective to program the one or more processors to perform the various anomalous rights detection techniques and/or execute the various algorithms described herein.

In various examples, network 104 is a wide area network, such as the Internet, while in other embodiments, the network 104 is a local area network (LAN) over which requests may be received. In some further embodiments, network 104 is a combination of the Internet and a LAN.

The sample of users 120 visiting the treated website/web service may be used to predict the sample size of new users visiting the website and/or using the web service during various future time periods using the techniques described above in section 2.3 (inter alia). For example, the first time period 110 may comprise a single week in which live traffic is subjected to the treated website/web service, etc. After determining the observed sample of users 120 visiting the treated website/web service, the number of new users that will visit the website, use the web service, etc., may be predicted for a second (future) time period 112 (e.g., a second week), a third (future) time period 114, and so on. For example, at action 124, the sample size of new users visiting in the second time period may be predicted. Similarly, at action 134, the sample size of new users visiting in the third time period may be predicted. For example, equation (13) above may be used to determine the new users triggering in each of the subsequent time periods.

Thereafter, for the relevant full time period (e.g., the first time period 110 combined with one or more of the future time periods), the sample mean ($\mu$) and variance ($\sigma^2$) of the KPIs for the relevant time period may be determined based on the observed KPI data 122. For example, at action 126, the sample mean and variance may be determined for the first time period (observed) and the second time period (predicted). For example, the sample mean and variance are determined for the time up to the end of the second time period. At action 136, the sample mean and variance may be determined for the first time period, second time period, and third time period, and so on. For example, the mean KPI for each relevant time period (e.g., observed+predicted time periods) is given by equation (14) above and the KPI variance for each relevant time period is given by equation (15) above.

As described above, the mean and variance may be used to compute the statistical power to detect desired lift at the relevant time period. For example, at action 128, the mean and variance for the time up to the end of the second time period (e.g., for the first time period 110 and second (future) time period 112) may be used to compute the statistical power for detecting the desired lift (e.g., desired lift in KPI 101) for the time up to the end of the second time period (e.g., the statistical power for the first time period 110 and the second (future) time period 112). The statistical power may be computed using equation (16). Similarly, at action 138, the mean and variance for the time up to the end of the third time period (e.g., first time period 110, second (future) time period 112, and third (future) time period 114) may be used to compute the statistical power for detecting the desired lift (e.g., desired lift in KPI 101) for the time up to the end of the third time period 114 (e.g., the statistical power for the first time period 110, the second (future) time period 112, and the third (future) time period 114).

The sample size and duration prediction system 102 may predict a recommended duration of the change to the website/web service 130. For example, the statistical power computed at the various time horizons (e.g., after second (future) time period 112, third (future) time period 114, and so on) may represent an ability to detect the desired lift in KPI 101 for each time horizon. Accordingly, in some examples, the statistical power computed at the various time horizons may be compared to a threshold statistical power (e.g., 80% or any desired value). The recommended duration of the change to the website/web service 130 may be the minimum duration at which the computed statistical power exceeds the threshold statistical power for the input desired lift in KPI 101.

For example, the threshold statistical power may be 80% and the desired lift in KPI (e.g., revenue) may be 0.4%. The statistical power computed after the second (future) time period 112 may be 62%, the statistical power computed after the third (future) time period 114 may be 77%, and the statistical power computed after a fourth (future) time period (not shown in FIG. 1) may be 81%. Accordingly, in the example, the recommended duration may be through the fourth (future) time period (e.g., 4 weeks if each time period is 1 week in duration).

Figure 2:
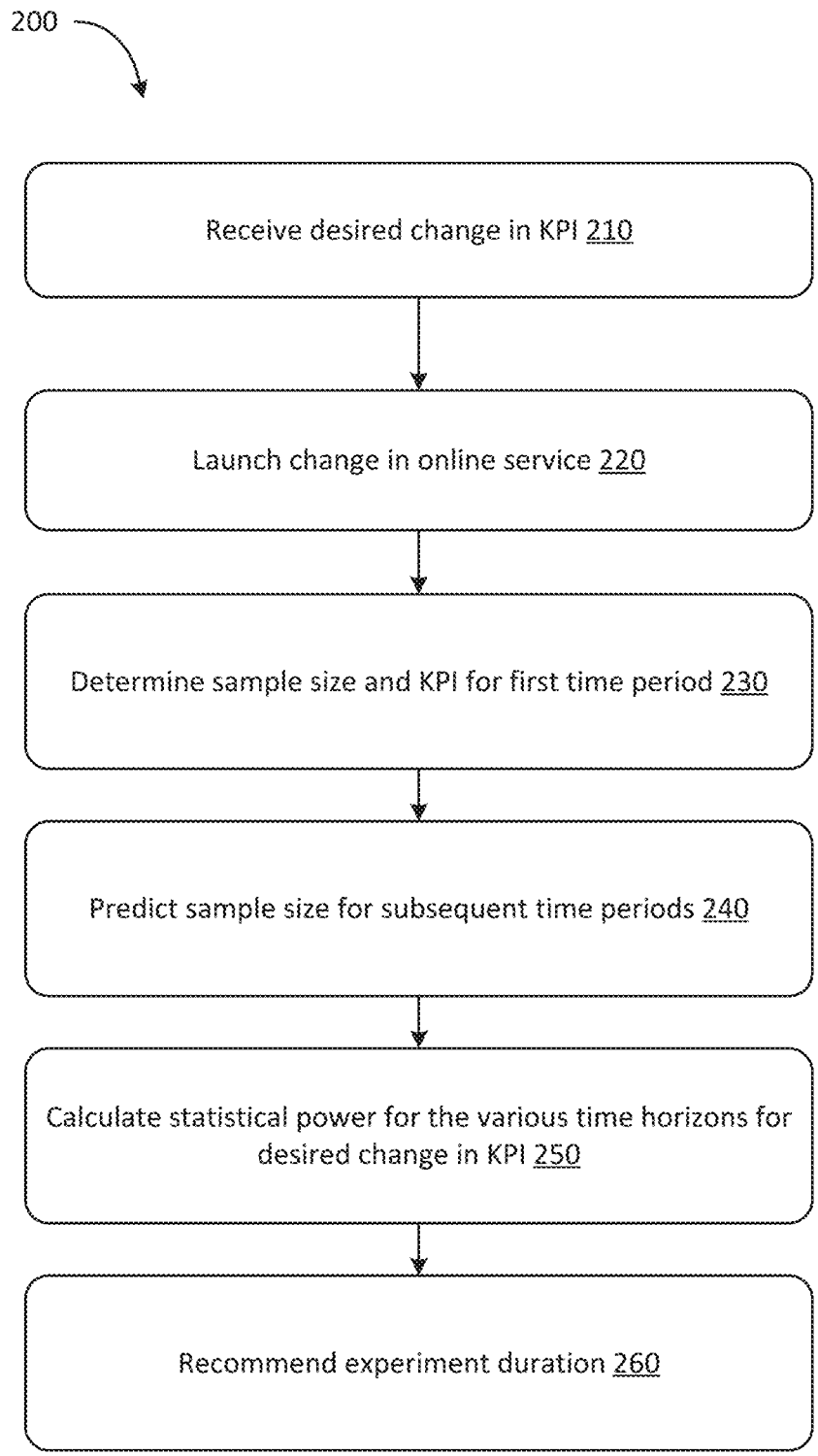
FIG. 2 depicts a flow chart illustrating an example process for recommending duration for online activity, in accordance with various aspects of the present disclosure.

FIG. 2 depicts a flow chart showing an example process 200 for recommending duration of an online activity, in accordance with various aspects of the present disclosure. Those portions of FIG. 2 that have been previously discussed in reference to FIG. 1 may not be described again for purposes of clarity and brevity. The actions of the process 200 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 200 of FIG. 2 may begin at action 210, at which a desired change in KPI may be received. In various examples, where the sample size and duration prediction system 102 for online activity is implemented as a web service (e.g., a cloud-based web service), the KPI may be specified through an API of the web service. In various examples, multiple KPIs of interest may be submitted. In general, the desired change in the KPI may reflect the amount of change for the relevant indicator that the entity availing itself of the sample size and duration prediction system 102 would like to detect during their experiment based on some changed feature/features of their website/web service. KPI change need not be provided as a percentage, but instead may be a desired amount of KPI change.

Processing may continue at action 220 at which the change in the online service may be launched. Any desired change may be made according to the experiment. For example, a new graphical control element, new functionality, a new visual design, etc., may be implemented in an A/B experiment.

Processing may continue at action 230 at which the sample size and KPI for the first time period may be determined. For example, the treated web site/web service may be subjected to traffic for the first time period and the KPIs and sample size of traffic (e.g., new users triggering) may be determined based on user traffic and activity for the first time period. Processing may continue at action 240, at which sample size for various subsequent time periods may be predicted. The sample size may be predicted as described above in section 3.1 (inter alia). The sample size may be predicted for any number of future time periods, depending on the implementation. Additionally, the sample mean and variance may be predicted for the relevant time horizons (e.g., the first time period+the subsequent time period(s)) as described above in section 3.2 (inter alia).

Processing may continue at action 250, at which the statistical power for the input desired change in KPI and for the various time horizons may be calculated. For each relevant time horizon (e.g., first time period+second time period, first time period+second time period +third time period, etc.), the statistical power may be calculated given the desired change in KPI input at action 210. The statistical power against a fixed effect size (e.g., desired change in KPI) may be determined as described above in section 3.3 (inter alia). Processing may continue at action 260 at which an experiment duration may be recommended. As described above, the duration may be the minimum duration at which the calculated statistical power for the fixed effect size exceeds a threshold statistical power.

Figure 3:
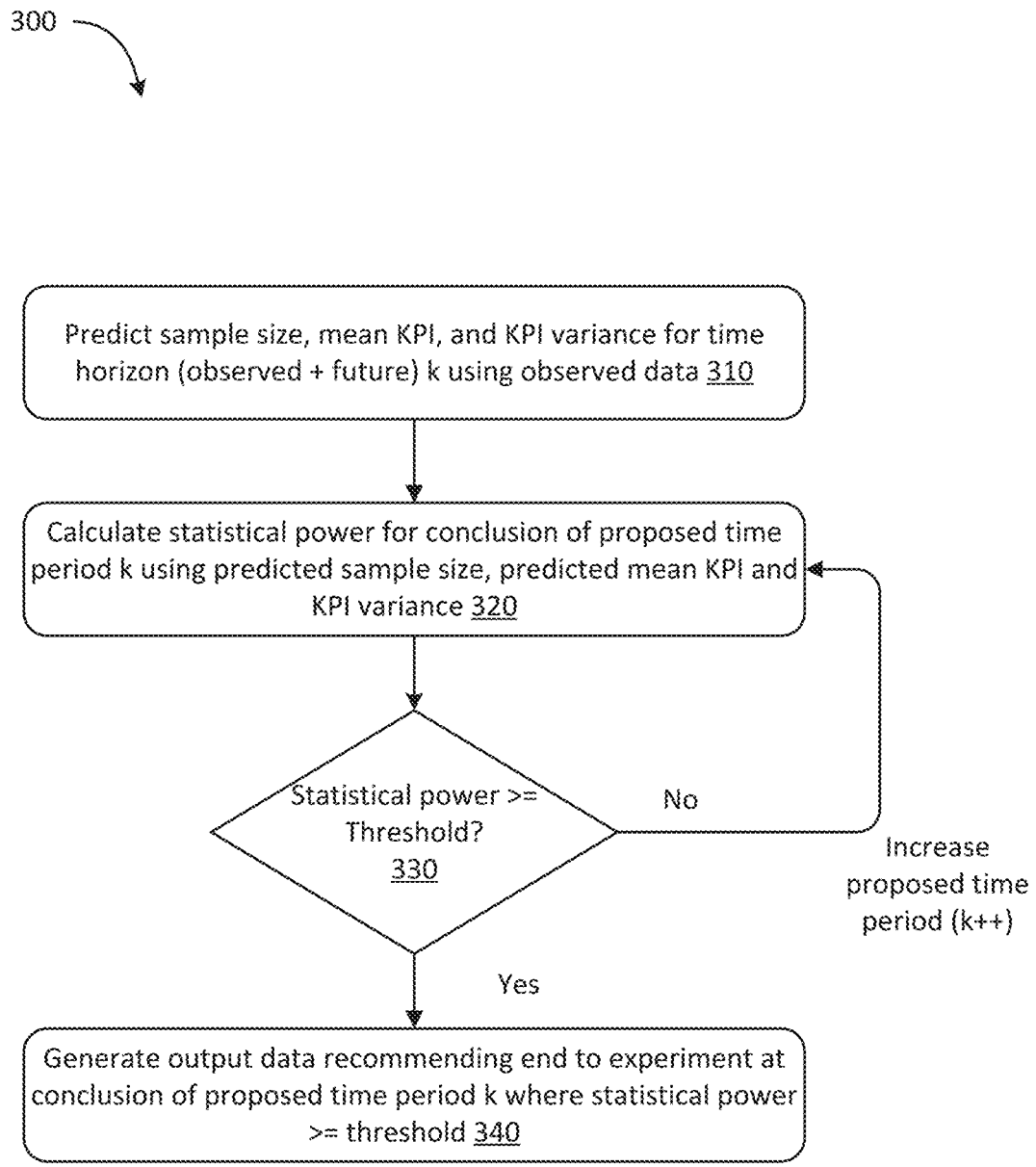
FIG. 3 depicts another example flow chart illustrating an example process for recommending duration using statistical power, in accordance with various aspects of the present disclosure.

FIG. 3 depicts another example flow chart illustrating an example process 300 for recommending duration using statistical power, in accordance with various aspects of the present disclosure. Those portions of FIG. 3 that have been previously discussed in reference to FIGS. 1-2 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 300 of FIG. 3 may begin at action 310, at which the sample size, mean KPI, and KPI variance may be predicted for a time horizon (e.g., the past observed time period plus the future time period) k using the observed data from a past time period. The sample size, mean KPI, and KPI variance may be predicted as described above in sections 2.3, 2.4, inter alia.

Processing may continue at action 320, at which statistical power may be calculated for the conclusion of the proposed time period k using the predicted sample size, predicted mean KPI, and predicted KPI variance determined at action 310. At action 330, a determination may be made whether the statistical power calculated for the relevant full time period (and for the given effect size (e.g., the input KPI lift, etc.) is ≥a threshold statistical power. If so, processing may continue at action 340, at which output data may be generated recommending to end the experiment at the conclusion of the time period k where the statistical power is ≥the threshold statistical power. For example, a recommendation may be displayed on a GUI stating "For the desired KPI lift, the recommended duration of the A/B experiment is X weeks." If, at action 330, the statistical power is less than the statistical power threshold, the value for k may be incremented and processing may return to action 320 at which the statistical power at the conclusion of the next time period k (e.g., a longer time horizon) may be computed using the predicted sample size, predicted mean KPI, and predicted KPI variance at the conclusion of the proposed time period k.

Figure 4:
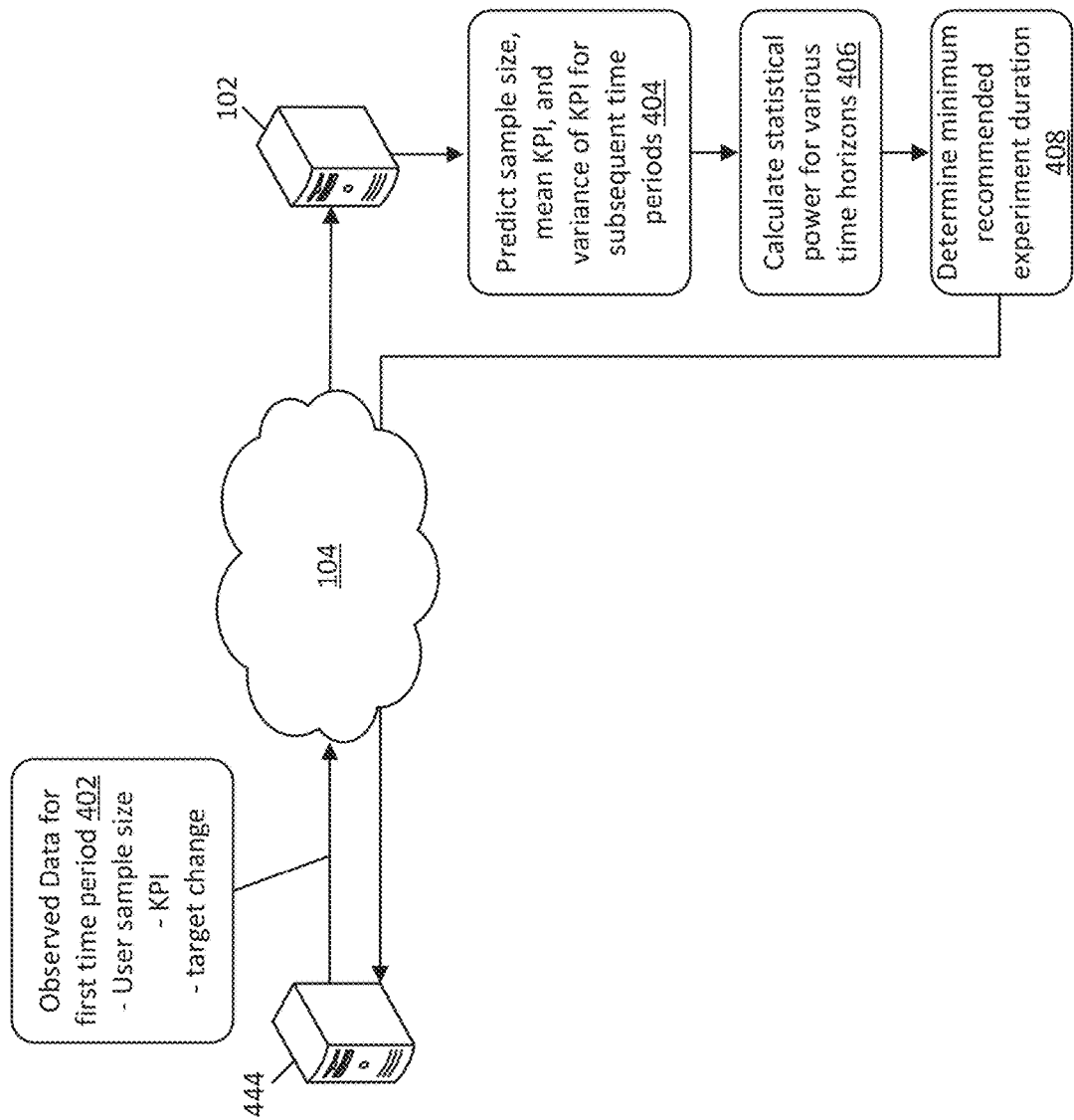
FIG. 4 is an example of duration recommendation as a cloud-based service, in accordance with various aspects of the present disclosure.

FIG. 4 is an example of duration recommendation as a cloud-based service, in accordance with various aspects of the present disclosure. In some examples, the sample size and duration prediction system 102 for online activity may be implemented as a service over a network 104. Accordingly, various entities (such as an entity associated with computing device(s) 444) may use the sample size and duration prediction system 102 for online activity (e.g., via an API). For example, the entity associated with computing device(s) 444 may be interested in implementing new functionality, a new service, a new design, an updated website, etc., related to an existing or new online system. The entity may be interested in learning about the effect on some key performance indicator of the change and/or new system. In a simple example, the entity may be considering changing their website's user experience and/or design. The entity may be interested in how this might affect e-commerce revenue (e.g., a KPI) generated through the website. Accordingly, the entity associated with computing device(s) 444 may run an A/B experiment.

After allowing live traffic to the modified system for a first time period and gathering data related to the live traffic (e.g., observed data for first time period 402, such as an observed sample size of first time users of the system, KPI data indicating revenue generated from the users, etc.) the gathered data for the first time period may be sent (e.g., via the API) to the sample size and duration prediction system 102. Additionally, the entity may send the desired effect that they would like to detect as an input to the sample size and duration prediction system 102 (e.g., % increase in KPI). Thereafter, at action 404, the sample size and duration prediction system 102 may predict the sample size, mean KPI, and variance of KPI for various subsequent time periods, as described herein. The predicted sample size of users, predicted mean KPI, and predicted variance of KPI may be used to calculate statistical power to detect the predefined effect at the relevant time horizons.

Next, for various time horizons (e.g., the first time period+X subsequent time periods), the sample size and duration prediction system 102 may calculate the statistical power for the desired effect at the various different time horizons (action 406). The sample size and duration prediction system 102 may determine the minimum recommended experiment duration by comparing the statistical power for the relevant periods to a statistical power threshold. The statistical power threshold may be selected by the entity (e.g., via the API) and/or a default value may be selected (e.g., 80%). The minimum recommended experiment duration may be determined (action 408). The minimum recommended experiment duration may be the shortest time period for which the calculated statistical power exceeds the threshold statistical power (for the input effect size (e.g., % increase in KPI). The minimum recommended experiment duration may be provided to the computing device(s) 444. Accordingly, the entity associated with the computing device(s) 444 may conclude the A/B experiment after the recommended experiment duration.

Figure 5:
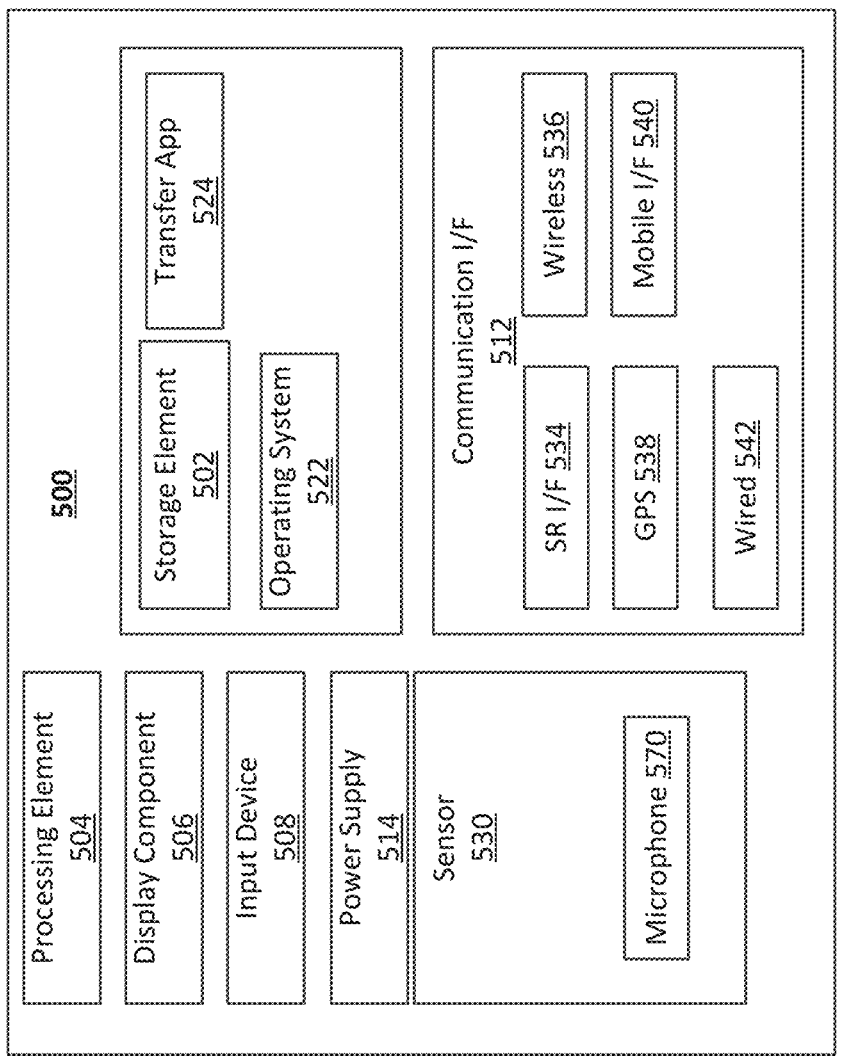
FIG. 5 is a block diagram showing an example architecture of a computing device that may be used in accordance with various embodiments described herein.

FIG. 5 is a block diagram showing an example architecture 500 of a computing device that may be used to implement, at least in part, a sample size and duration prediction system 102 for online activity, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
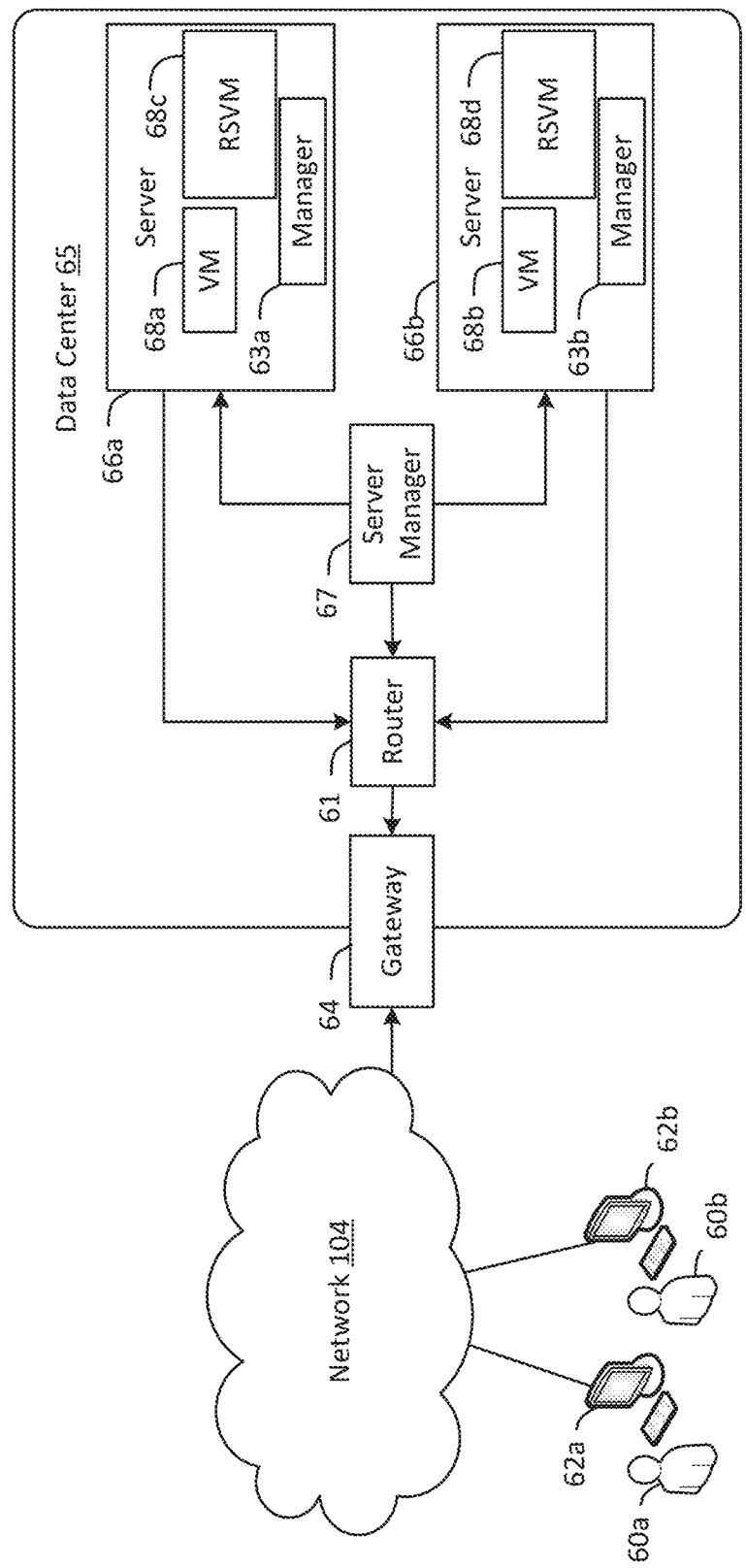
FIG. 6 is a diagram illustrating an example system for sending and providing data that may be used in accordance with the present disclosure.

An example system for implementing a sample size and duration prediction system will now be described in detail. In particular, FIG. 6 illustrates an example computing environment in which the embodiments described herein may be implemented. For example, the computing environment of FIG. 6 may be configured to provide sample size and duration prediction as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various adversarial network detection described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As noted above, multiple devices may be employed in a single system. In such a multi-device system, each of the devices may include different components for performing different aspects of the system's processing. The multiple devices may include overlapping components. The components used to implement the multiple randomization designs, as described herein, are exemplary, and may be located as a stand-alone device or may be included, in whole or in part, as a component of a larger device or system.

Figure 9:
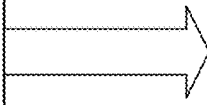
FIG. 9 depicts an example graphical user interface that may be used in accordance with the duration recommendation systems described herein.

FIG. 9 depicts an example graphical user interface that may be used in accordance with the duration recommendation systems described herein. As described above (e.g., in reference to FIG. 4, inter alia), the online activity duration recommendation techniques and/or systems described herein may be provided as a cloud-based web service in some examples. FIG. 9 shows an example graphical user interface (GUI) that may be used to interact with such a cloud-based web service. The particular GUI used may be highly implementation specific and may include different selectable controls relative to the example shown in FIG. 9. The example GUI of FIG. 9 provides selectable controls for the type of impact on KPI to be determined (e.g., % change, annualized change, absolute (raw) change, etc.). Additionally, in the example of FIG. 9, the user may select between Bayesian (Prob >0%) and p-Value statistical methods. Further, the user may select one or more regions for the duration recommendation. For example, the user may want the duration recommendation for North America, for a specific country, marketplace, etc. Different duration recommendations may be optionally provided for each region.

The GUI of FIG. 9 shows the current duration of the currently-running experiment and calculates a duration recommendation for the input KPI change (e.g., 0.25% change). In the example, the duration recommendation is 2 weeks (as opposed to the current 3 week schedule). For example, the online activity (e.g., an online service) may currently be the subject of an A/B text, and, as such, may have at least one modified feature. The current A/B test may have been planned for an original duration of time and may be subjected to traffic. Thereafter, using the techniques described herein and the sample size of users (and the KPI data associated with that sample size of users) during a first time period (e.g., the past week, 2 weeks, 1 day, etc.), a duration recommendation may be calculated and provided (e.g., as shown). The output recommendation of two weeks may represent a recommendation to route traffic to the modified version of the online service for the 2 weeks, which is of shorter duration relative to the original plan for the A/B test.

The GUI provides selectable controls allowing the user to accept the recommendation and implement the modified online activity (e.g., the treated website/webservice) for the recommended 2 weeks. Alternatively, the user can maintain the current duration (3 weeks). The duration recommendation system may thereby programmatically control the duration of the modified online activity according to the user selection.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:
receiving a request via a graphical user interface to modify a website from a previous version of the website to a modified version of the website for a first duration, the modified version of the website including at least one new feature relative to a previous version of a website;

implementing the at least one new feature and subjecting the modified version of the website to live traffic;

receiving first data describing a first sample of users that navigated to the modified version of the website during a first time period, wherein the first sample of users has a first sample size;

receiving first key performance indicator (KPI) data related to the first sample of users;

determining a predicted sample size of a predicted sample of users navigating to the modified version of the website during a second time period after the first time period, wherein the predicted sample size is determined based on the first data;

determining a predicted mean KPI and a predicted variance of KPI for the predicted sample of users based on the first KPI data;

calculating a statistical power using the predicted sample size of users, the predicted mean KPI, and the predicted variance of KPI, the statistical power being related to an ability to predict a predefined effect on the KPI for a given time period;

determining a second duration for which to subject the modified version of the website to traffic using the statistical power;

providing, using the graphical user interface, a recommendation to subject the modified version of the website to traffic for the second duration;

receiving input accepting the recommendation; and removing the modified version of the website from live traffic after the second duration of time has elapsed.

2. The computer-implemented method of claim 1, further comprising:

for each of a plurality of different time periods after the first time period, determining a respective predicted sample size of a respective predicted sample of users navigating to the modified version of the website;

determining respective predicted mean KPIs and respective predicted variance of KPIs for each of the respective predicted samples of users; and calculating respective statistical powers for each of the respective predicted samples of users.

3. The computer-implemented method of claim 2, further comprising:

determining the second duration to subject the modified version of the website to traffic by selecting a minimum time period among the different time periods for which the respective statistical power exceeds a threshold statistical power.

4. A computer-implemented method comprising:

determining that an online service including at least one modified feature is being subjected to traffic during a first duration of time;

receiving first data, the first data comprising a measurement of a first sample of users interacting with the online service during a first time period, the first sample of users having a first sample size;

receiving first key performance indicator (KPI) data, the KPI data comprising a measured interaction with the online service by the first sample of users;

determining a predicted sample size of a predicted sample of users that will interact with the online service for a second time period following the first time period;

determining a predicted statistical power using the predicted sample size;

determining a minimum amount of time to route traffic to the online service based at least in part on the predicted statistical power; and outputting, using a graphical user interface, a recommendation to route traffic to the online service for the minimum amount of time, wherein the minimum amount of time is of a shorter duration relative to the first duration of time.

5. The computer-implemented method of claim 4, further comprising:

receiving a predefined KPI lift; and determining the predicted statistical power for the predefined KPI lift based at least in part on the predicted sample size.

6. The computer-implemented method of claim 4, further comprising:

determining an observed mean of the first KPI data for the first sample of users;

determining an observed variance of the first KPI data for the first sample of users;

determining a predicted mean KPI for the predicted sample of users; and determining a predicted KPI variance for the predicted sample of users.

7. The computer-implemented method of claim 6, further comprising determining the predicted statistical power further using the predicted mean KPI and the predicted KPI variance.

8. The computer-implemented method of claim 4, wherein the predicted statistical power is determined for the second time period based on a predicted mean KPI and a predicted KPI variance of the predicted sample of users.

9. The computer-implemented method of claim 4, further comprising:

determining a second predicted sample size of a second predicted sample of users that will interact with the online service for a third time period following the first time period and the second time period; and determining a second predicted statistical power using the second predicted sample size.

10. The computer-implemented method of claim 9, further comprising:

determining that the predicted statistical power is less than a threshold statistical power; and determining that the second predicted statistical power is greater than or equal to the threshold statistical power, wherein the minimum amount of time to route traffic to the online service is determined to be the third time period.

11. The computer-implemented method of claim 4, further comprising:

determining the predicted sample size of the predicted sample of users that will interact with the online service for the second time period following the first time period by:

determining a first set of users $n_0$ that did not interact with the online service during the first time period;

predicting among the first set of users $n_0$ a subset of the first set of users $n_{00}$ that also will not interact with the online service during the second time period; and subtracting the subset of the first set of users $n_{00}$ from the first set of users $n_0$ to calculate the predicted sample size of users.

12. The computer-implemented method of claim 11, further comprising predicting the subset of the first set of users $n_{00}$ using Monte-Carlo Ratio-of-Uniforms.

13. A system comprising:
at least one processor; and
non-transitory computer-readable memory storing instructions that, when executed by the at least one processor, are effective to:
  determine that an online service including at least one modified feature is being subjected to traffic during a first duration of time;
  receive first data, the first data comprising a measurement of a first sample of users interacting with the online service during a first time period, the first sample of users having a first sample size;
  receive first key performance indicator (KPI) data, the KPI data comprising a measured interaction with the online service by the first sample of users;
  determine a predicted sample size of a predicted sample of users that will interact with the online service for a second time period following the first time period;
  determine a predicted statistical power using the predicted sample size;
  determine a minimum amount of time to route traffic to the online service based at least in part on the predicted statistical power; and
  output, using a graphical user interface, a recommendation to route traffic to the online service for the minimum amount of time, wherein the minimum amount of time is of a shorter duration relative to the first duration of time.

14. The system of claim 13, the non-transitory computer-readable memory storing further instructions that, when executed by the at least one processor, are further effective to:
  receive a predefined KPI lift; and
  determine the predicted statistical power for the predefined KPI lift based at least in part on the predicted sample size.

15. The system of claim 13, the non-transitory computer-readable memory storing further instructions that, when executed by the at least one processor, are further effective to:
  determine an observed mean of the first KPI data for the first sample size of users;
  determine an observed variance of the first KPI data for the first sample size of users;
  determine a predicted mean KPI for the predicted sample size of users; and
  determine a predicted KPI variance for the predicted sample size of users.

16. The system of claim 15, the non-transitory computer-readable memory storing further instructions that, when executed by the at least one processor, are further effective to determine the predicted statistical power further using the predicted mean KPI and the predicted KPI variance.

17. The system of claim 13, wherein the predicted statistical power is determined for the second time period based on a predicted mean KPI and a predicted KPI variance of the predicted sample of users.

18. The system of claim 13, the non-transitory computer-readable memory storing further instructions that, when executed by the at least one processor, are further effective to:
  determine a second predicted sample size of a second predicted sample of users that will interact with the online service for a third time period following the first time period and the second time period; and
  determine a second predicted statistical power using the second predicted sample size.

19. The system of claim 18, the non-transitory computer-readable memory storing further instructions that, when executed by the at least one processor, are further effective to:
  determine that the predicted statistical power is less than a threshold statistical power; and
  determine that the second predicted statistical power is greater than or equal to the threshold statistical power, wherein the minimum amount of time to route traffic to the online service is determined to be the third time period.

20. The system of claim 13, the non-transitory computer-readable memory storing further instructions that, when executed by the at least one processor, are further effective to:
  determine the predicted sample size of the predicted sample of users that will interact with the online service for the second time period following the first time period by:
    determine a first set of users $n_0$ that did not interact with the online service during the first time period;
    predict among the first set of users $n_0$ a subset of the first set of users $n_{00}$ that also will not interact with the online service during the second time period; and
    subtract the subset of the first set of users $n_{00}$ from the first set of users $n_0$ to calculate the predicted sample size of users.

* * * * *